US012645634B2

(12) United States Patent
Balle et al.

(10) Patent No.: US 12,645,634 B2
(45) Date of Patent: Jun. 2, 2026

(54) TECHNOLOGIES FOR HARDWARE MICROSERVICES ACCELERATED IN XPU

(71) Applicant: Intel Corporation, Santa Clara, CA (US)

(72) Inventors: Susanne M. Balle, Hudson, NH (US); Duane E. Galbi, Wayland, MA (US); Andrzej Kuriata, Gdansk (PL); Sundar Nadathur, Cupertino, CA (US); Nagabhushan Chitlur, Portland, OR (US); Francesc Guim Bernat, Barcelona (ES); Alexander Bachmutsky, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 126 days.

(21) Appl. No.: 17/549,727

(22) Filed: Dec. 13, 2021

(65) Prior Publication Data

US 2023/0185760 A1     Jun. 15, 2023

(51) Int. Cl.
*G06F 15/78*          (2006.01)
*G06F 9/50*           (2006.01)

(52) U.S. Cl.
CPC ........ *G06F 15/7889* (2013.01); *G06F 9/5044* (2013.01); *G06F 2209/5019* (2013.01); *G06F 2209/509* (2013.01)

(58) Field of Classification Search
CPC .................. G06F 2209/5019; G06F 2209/509
See application file for complete search history.

(56) References Cited

U.S. PATENT DOCUMENTS 10,691,597 B1 *  6/2020  Akkary .................. H04L 67/60
10,754,666 B1 *  8/2020  Sorani ................. G06F 15/7825
(Continued)

OTHER PUBLICATIONS

David Ojika[1][2], Ann Gordon-Ross[1], Herman Lam[1], Bhavesh Patel[2], Gaurav Kaul[3], Jayson Strayer[3], "Using FPGAs as Microservices: Technology, Challenges and Case Study", In 9th Workshop on Big Data Benchmarks Performance, Optimization and Emerging Hardware (BPOE-9), pp. 1-6 (Year: 2018).*
(Continued)

*Primary Examiner* — Courtney P Spann
(74) *Attorney, Agent, or Firm* — Compass IP Law PC

(57) ABSTRACT

Methods, apparatus, and software and for hardware microservices accelerated in other processing units (XPUs). The apparatus may be a platform including a System on Chip (SOC) and an XPU, such as a Field Programmable Gate Array (FPGA). The FPGA is configured to implement one or more Hardware (HW) accelerator functions associated with HW microservices. Execution of microservices is split between a software front-end that executes on the SOC and a hardware backend comprising the HW accelerator functions. The software front-end offloads a portion of a microservice and/or associated workload to the HW microservice backend implemented by the accelerator functions. An XPU or FPGA proxy is used to provide the microservice front-ends with shared access to HW accelerator functions, and schedules/multiplexes access to the HW accelerator functions using, e.g., telemetry data generated by the microservice front-ends and/or the HW accelerator functions. The platform may be an infrastructure processing unit (IPU) configured to accelerate infrastructure operations.

20 Claims, 7 Drawing Sheets

(56) References Cited

U.S. PATENT DOCUMENTS

| | | | |
|---|---|---|---|
| 11,194,707 | B2 | 12/2021 | Stalzer |
| 2019/0004871 | A1* | 1/2019 | Sukhomlinov ....... G06F 9/5038 |
| 2019/0050522 | A1 | 2/2019 | Alvarez et al. |
| 2019/0068693 | A1* | 2/2019 | Bernat ............... G06F 15/7807 |
| 2019/0155239 | A1* | 5/2019 | Salhuana ................ G06F 8/456 |
| 2020/0142735 | A1* | 5/2020 | Maciocco .............. G06F 8/443 |
| 2020/0371828 | A1* | 11/2020 | Chiou ................. G06F 11/0793 |
| 2021/0042254 | A1 | 2/2021 | Marolia et al. |
| 2021/0117249 | A1 | 4/2021 | Doshi et al. |
| 2021/0152659 | A1* | 5/2021 | Cai ......................... H04L 41/24 |
| 2021/0209035 | A1 | 7/2021 | Galbi et al. |
| 2021/0319307 | A1 | 10/2021 | Dhruvanarayan et al. |

OTHER PUBLICATIONS

Julien Lallet, Andrea Enrici and Anfel Saffar, "FPGA-based System for the Acceleration of Cloud Microservices", Aug. 16, IEEE, pp. 1-5 (Year: 2018).*
A. M. Caulfield et al., "A Cloud-Scale Acceleration Architecture," in 2016 49th Annual IEEE/ACM International Symposium on Microarchitecture (MICRO), Oct. 2016, 13 pages.
Eric Chung, et al., "Serving DNNs in Real Time at Datacenter Scale with Project Brainwave," IEEE Micro, vol. 38, Mar. 2018, 13 pages.
Fungible Storage Cluster, downloaded from website https://www.fungible.com/, Dec. 21, 2021, 6 pages.
J. Lallet et al., "FPGA based system for the acceleration of Cloud Microservices," in IEEE International Symposium on Broadband Multimedia Systems and Broadcasting (BMSB), Jun. 2018, 2 pages.
M. Branscombe, "FPGAs and the New Era of Cloud-based 'Hardware Microservices'," https://thenewstack.io/developers-fpgas-cloud/, Jun. 8, 2017, 9 pages.
Mazen Ezzeddine et al., "RESTful Hardware Microservices Using Reconfigurable Networked Accelerators in Cloud and Edge Datacenters", 2018 IEEE 7th International Conference on Cloud Networking (CloudNet), Oct. 2018, 4 pages.
Susanne M.Balle, et al., "Inter-Kernal Links for Direct Inter-FPGA Communication," White Paper, Distributed Direct Inter-FPGA Communication Framework, Multi-FPGA Dep Learning Inference Application and Model Parallelism, 2020.
International Search Report and Written Opinion for PCT Patent Application No. PCT/US22/48101, Mailed Feb. 21, 2023, 10 pages.
Extended European Search Report for Patent Application No. 22908182.3, Mailed Dec. 17, 2025, 9 pages.

* cited by examiner

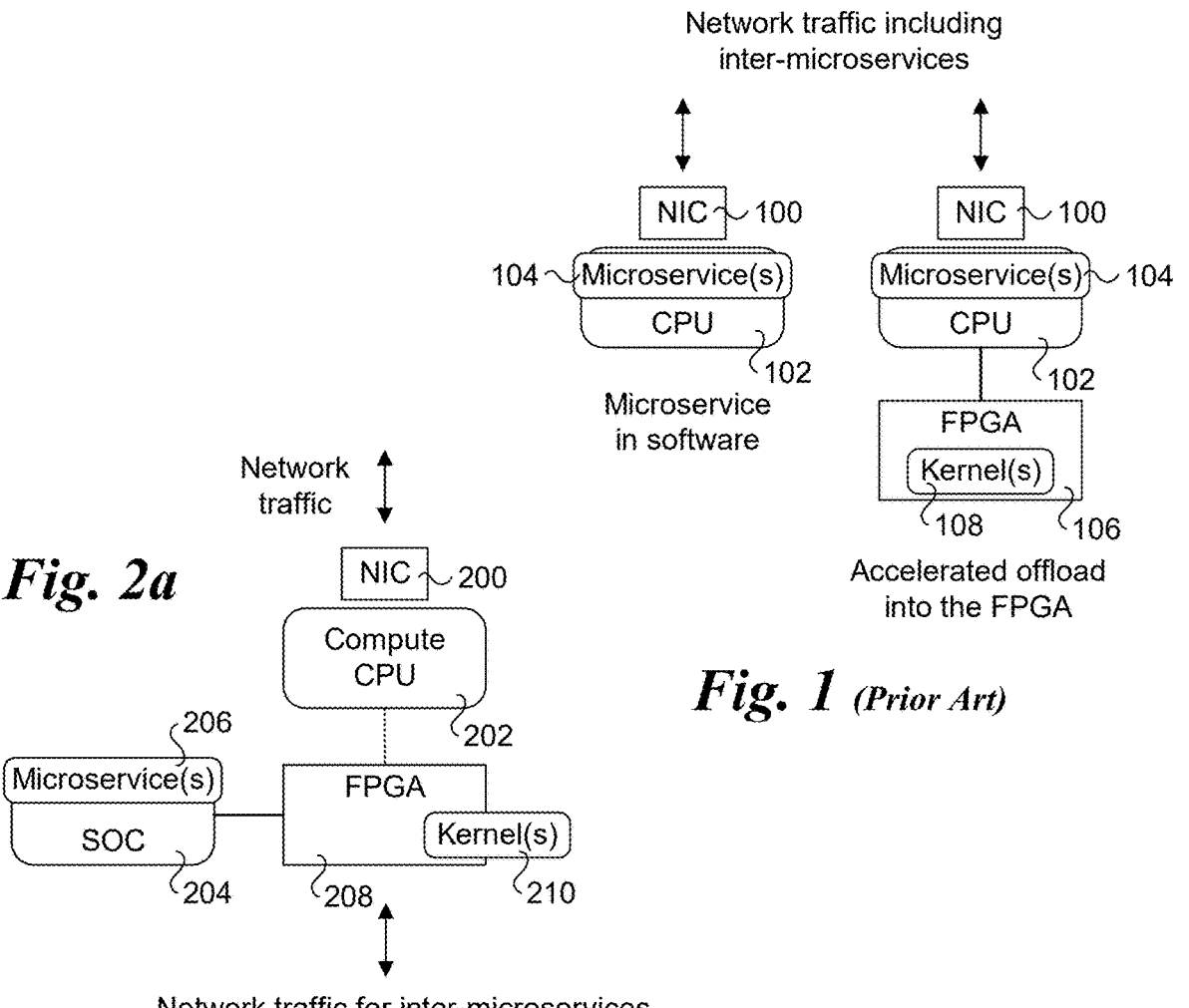

Network traffic including
inter-microservices

NIC ~100

104 ~ Microservice(s)

CPU

102

Microservice
in software

NIC ~100

Microservice(s) ~ 104

CPU

102

FPGA

Kernel(s)

108   106

Accelerated offload
into the FPGA

*Fig. 1* *(Prior Art)*

Network
traffic

*Fig. 2a*

NIC ~200

Compute
CPU

202

206

Microservice(s)

SOC

204

FPGA

208

Kernel(s)

210

Network traffic for inter-microservices
Private accelerator network

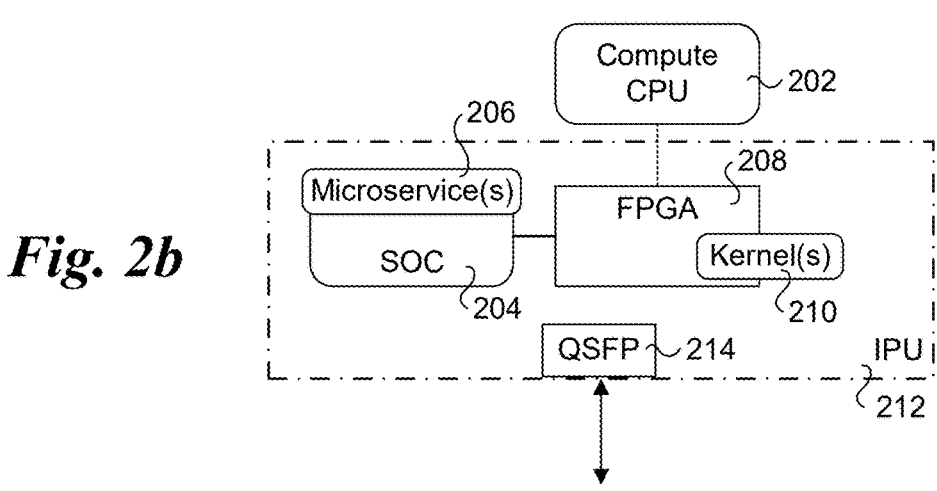

*Fig. 2b*

Compute
CPU ~202

206

208

Microservice(s)

SOC

204

FPGA

Kernel(s)

210

QSFP ~214

IPU

212

Network traffic including inter-microservices

TECHNOLOGIES FOR HARDWARE MICROSERVICES ACCELERATED IN XPU

BACKGROUND INFORMATION

Cloud Service Providers (CSPs) are shifting towards applications composed of graphs of hundreds of loosely coupled microservices and accelerating microservices such as Inference, network processing, compression, in search kernels in Field Programmable Gate Arrays (FPGAs), Application Specific Integrated Circuits (ASICs), and other accelerator devices. Examples of such applications include Inference with Brainwave (Microsoft), Warehouse-Scale Video Acceleration (Google, ASPLOS'21), etc.

Offloading workloads to accelerators is desirable for multiple reasons, including the potential for acceleration, offloading frees up the CPU (Central Processing Unit), and offloading provides security and ownership/control separation as opposed to even dedicated infrastructure CPU cores that in many cases still share some resources with the application cores. Current trends are to do workload and infrastructure acceleration in the other processing units, collectively referred to as XPUs. Generally, XPUs include but are not limited to one or more of Graphic Processor Units (GPUs) and General Purpose GPUs (GP-GPUs), Tensor Processing Units (TPUs), Data Processor Units (DPUs), Artificial Intelligence (AI) processors and AI inference units and/or other accelerators, ASICS, FPGAs, and/or other programmable logic (used for accelerator/compute purposes), etc.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1 is a diagram illustrating conventional implementation of microservices using software and using a combination of software and a portion of the microservice workload offloaded to an accelerator comprising an FPGA;

FIG. 2a is a diagram illustrating a first HW microservice use case in which one or more software microservices are executed on a System on Chip (SOC) and a portion of the microservice workload is offloaded as a HW microservice implemented in a kernel of an FPGA;

FIG. 2b is a diagram illustrating a second HW microservice use case in which the SOC and FPGA are implemented in an IPU;

DETAILED DESCRIPTION

Figure 3:
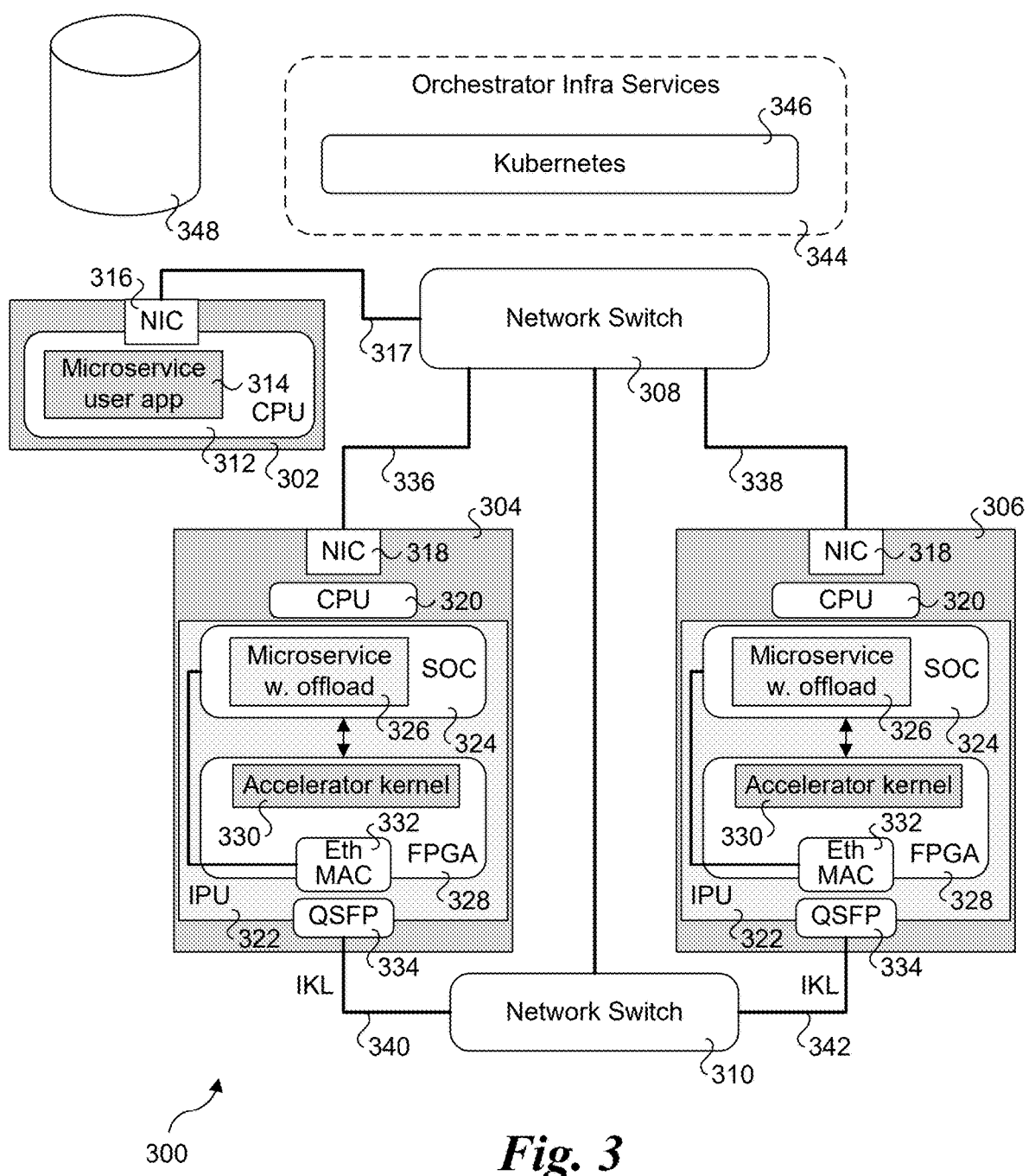
FIG. 3 is a diagram illustrating an exemplary environment including a pair of servers on which HW microservices are implemented.

Embodiments of methods, apparatus, and software and for hardware microservices accelerated in XPUs are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Microservices (or microservices architecture) are a cloud native architectural approach in which a single application is composed of many loosely coupled and independently deployable smaller components, or services. These services may have their own technology stack and generally communicate with one another over a combination of REST/RESTful APIs (Application Program Interfaces), event streaming, and message brokers.

Historically, microservices have been deployed entirely in software as a distributed set of processes running on virtual machines or containers using host platforms (e.g., servers) that are interconnected via networks in environments such as data centers and the like. While microservices may be deployed using various software frameworks and architectures, one or the more popular frameworks is Kubernetes®, which supports scalability and resiliency, among other features.

Customers of a managed Kubernetes® service care about microservices from functionality/performance and SLA (Service Level Agreement) point of view, so hardware (HW) microservices in many cases cannot only provide the answer for those requirements, but even improve the overall system behavior. Generally, HW microservices are optimized accelerated functions/kernels for XPUs/FPGAs provided in a repository or pre-deployed into the cloud that the customers can use in their microservice application to get optimized version of kernels.

Today, microservice offload acceleration in an XPU is defined from a resource point of view as requiring a server with two types of resources, CPU and XPU connected through PCIe (Peripheral Component Interconnect Express), hosted in traditional servers. With the emergence of disaggregated data center architectures this is no longer the right approach and this approach needs to be redefined.

In traditional datacenters, microservices are running on CPUs and when acceleration offload is performed it is done using a PCIe Accelerator cards enabling the kernels to be accelerated while still using the traditional compute CPU to run the software logic in the microservice server to program, to manage, and to interact with offloaded accelerated functions in the XPU. An example of this use case is shown in FIG. 1.

The left side of FIG. 1 shows a conventional approach under which microservices are implemented in entirely in software. The hardware components to facilitate this include a Network Interface Controller (NIC) 100 coupled to a CPU 102 on which microservices 104 are run. The use of software microservices in datacenters has seen substantial growth in the past decade. Traditionally, software microservices are implemented via distributed processes employing, e.g., RESTful interfaces, where a process executes a dedicated service (called a microservice). When married with high-bandwidth networking and virtualized environments, including those using virtual machines (VMs) and container-based deployments, such as Kubernetes, software microservices provide enhanced performance and scalability when compared to conventional software architectures. At the same time, software microservices are still CPU-bound—that is, all microservice workloads are performed via execution of software on CPUs.

In general, a hardware microservice is a microservice utilizing acceleration offload into an XPU. Examples of HW microservices use cases are network processing, compression, inference, etc. Because of the complexity of HW microservices, these are usually a combination of a server (front-end) and of an accelerated kernel (backend) performing the compute intensive tasks. Generally, in some embodiments the inter-node HW microservices network traffic does not go through a network interface, such as a NIC, but rather is directly between FPGAs when using SOC+XPU cards. Optionally, HW microservice may be deployed into the IPU in which case the inter-node HW microservices network traffic is inter-IPU and does employ network interfaces on the IPUs.

An example of a conventional approach for implementing a HW microservice is shown on the right side of FIG. 1, which depicts offloading of microservice(s) workload(s) to an accelerator comprising an FPGA 106. One or more kernels 108 are programmed in FPGA 106, where kernels 108 are used to execute HW microservice(s) in hardware. As discussed above, under a common approach FPGA 106 would be implemented in a PCIe accelerator card or the like.

In today's composable datacenters, an orchestrator composes logical servers from resources on sleds (including headless sleds) which are managed and hosted by an IPU that also enforces their use. As used herein, the term "IPU" refers to an infrastructure Processing Unit, which may take different forms (such as examples described and illustrated herein) and provide facilities for hardware-based acceleration services as well as memory, storage, and networking functions. Hardware microservices in the IPU are used for infrastructure acceleration.

With the emergence of the IPU and of standalone "SOC (System On Chip)+XPUs" and "SOC+ASIC+XPU" platforms/cards such as Intel® FPGA Oak Spring Canyon and Big Spring Canyon cards, Nvidia® Bluefield, Fungible and Pensando Data Processing Unit (DPU), IPUs, etc., a new use case is emerging with a need to deploy accelerated microservices onto "SOC+XPU" platforms/cards in their own security domain, efficiently and at scale.

Under these emerging platforms/cards, the HW microservice is composed of a software microservice server (application and control logic software, e.g., server) running on small SOC or ASIC such as an Intel® Xeon-D®, ARM®-based SOC, RISC-based SOC, and of an XPU optimized accelerated function (kernel). Hardware microservices are ideal for accelerated microservices using a combination of SOC+XPU and SOC+ASIC+XPU.

FIGS. 2a and 2b show examples of HW microservices in FPGAs using these emerging platform architectures. The components illustrated in FIG. 2a include a NIC 200, a compute CPU 202, an SOC 204 on which microservices 206 are run, and an FPGA 208 in which one or more kernels 210 are programmed and executed. As shown in FIG. 2b, SOC 204, microservices 206, FPGA 208 and kernels 210 are implemented in an IPU 212. The IPU further includes a QSFP network interface 214. QSFP (Quad Small Form factor Pluggable), is a compact, hot-pluggable network interface module used for both telecommunication and data communications applications. Different QSFP modules supports Ethernet, Fibre Channel, InfiniBand and SONET/SDH standards with different data rate options over physical media including optical fiber and copper cables.

In the HW microservices use cases in FIGS. 1, 2a, and 2b, the "SOC+XPU" and IPU can be set up in its own security domain so that the main compute CPU is in a separate domain allowing CSPs to rent the main CPU out to developers (VM, containers, baremetal server, etc.) while also offering pre-deployed or on-demand HW microservices of highly optimized XPU kernel with a flexible standard interface to microservice developers looking at replacing their home-written algorithm with an highly optimized kernel. In the case of infrastructure acceleration, hardware microservices would be deployed and used to accelerate components in the management stack such as for example gRPC or any networking processing acceleration needed.

FIG. 3 shows an environment 300 including servers 302, 304, and 306 coupled in communication via network switches 308 and 310. Server 302 includes a CPU 312 on which a microservice user application 314 is executed, along with a NIC 316 coupled to switch 308 via a network link 317. Servers 304 and 306 have similar configuration, with each server including a NIC 318, a CPU 320, and an IPU 322. IPU 322, which in one embodiment comprises an PCIe board installed in an PCIe expansion slot, includes an SOC 324 on which a microservice with offload 326 is executed, and an FPGA 328 that is programmed to implement an accelerator kernel 330 and configured to implement an Ethernet MAC block 332. IPU 322 further includes a QSFP module 334 comprising a network interface.

NICs 318 on servers 304 and 306 are respectively connected to network switch 308 via links 336 and 338. QSFP module 334 on server 304 is connected to network switch 310 via a network link 340, while QSFP module 334 on server 306 is connected to network switch 310 via a network link 342. In one exemplary and non-limiting embodiment, links 317, 336, 338, 340, and 342 are Ethernet links, such as high-speed Ethernet links have a bandwidth of 50 Gigabits per second (Gb/s) or higher. In one embodiment, all or a portion of links 317, 336, 338, 340, and 342 are implemented using a fiber media (e.g., optical cables). Optionally, copper cabling may be used for all or a portion of links 336, 338, 340, and 342.

In one embodiment, links 340 and 342 implement an Inter-Kernel Links (IKL) protocol, which is low latency and high bandwidth streaming protocol and architecture with built-in reliability and control flow for direct inter-FPGA communication. IKL was introduced in Balle, S. M., Tetreault, M., & Dicecco, R. *Inter-Kernel Links for Direct Inter-FPGA Communication*. Using IKL, developers can design applications in OpenCL™, high-level synthesis (HLS), or register transfer level (RTL) that use direct inter-FPGA communication using FPGA Programmable Acceleration Cards (e.g., Intel® FPGA PACs) and IPUs such as described and illustrated herein. Users can pipeline tasks within an application to run on multiple FPGAs as well as partition their designs between FPGAs, thereby increasing their overall available resources. IKL can also be used for Inter-Kernel communication between other types of accelerators employing Kernel communication, such as GPUs, and Vector Processing Units (VPUs), as well as other XPUs.

Server 302 may generally comprise a conventional server used in data centers that may be packaged using various form factors, such as, but not limited to a 1U or 2U server, a server blade or server module, or a server board deployed in a server sled or the like. Server 302 is used to execute (primarily) CPU-bound workloads using application running on a host operating system, one a Guest/VM, or in a container. For example, the software architecture for server 302 may include a "bare metal" Type-1 hypervisor, a Virtual Machine Manager (VMM) or Type-2 hypervisor, or a container-based architecture, such as but not limited to Docker® style containers. In some embodiments, the software architecture on server 302 employs Kubernetes® pods, as described in further detail below.

Servers 304 and 306 are used to implement workload employing offloaded HW microservices. In some embodiments, a small portion the compute cycles of CPU 320 is used to perform management operations relating to operations performed by IPUs 322, with the remaining compute resources for CPU 320 used to host software-based workloads. For example, a CSP or the like may lease CPU resources provided by CPU 320 to one or more tenants. In another embodiment (not shown), servers 304 are "headless" servers.

Environment 300 further includes orchestrator infrastructure services 344 including a Kubernetes module 346. Environment 300 also implements one or more forms of data storage 348. Generally, data storage 348 may represent various types of data storage devices and/or architecture, including local data storage, a storage pool or the like in a disaggregated data center environment, or a storage layer provided by a Storage as a Service (STaaS) CSP such as but not limited to AWS S3 and AWS xFS, Google Cloud Storage, IBM STaaS, Oracle Cloud Storage, Dropbox, Box Cloud Storage, etc.

HW Microservices Driven Multiplexing on Accelerated Kernels in XPUs

In accordance with some aspects, HW micro-services are enabled with "smart" multiplexing of the XPU or XPUs for offload. A novel way of optimizing "sharing" of the XPU between multiple microservices has been developed, where the sharing and management of XPUs is triggered by the running microservices themselves and not ahead of time by the orchestrator allocating static FPGA slots or resources to a given application. The focus on both microservices applications and infrastructure and the introduction of SOC+ FPGAs such as Big Spring Canyon, enables us to innovate around a third acceleration use case that combine the previously mentioned use cases; at the same time, similar concepts apply to non-FPGA implementations, as well. The solutions address deploying and managing HW microservices running on the SOC of the SOC+FPGA and offloading into the accelerator FPGA while also taking advantage of the built-in storage and networking support. This enables creation of a novel, optimized, and secure architecture for HW microservices that can be leveraged by datacenter owners to offer their customers a service encapsulating proprietary IP (Intellectual Property).

Figure 4:
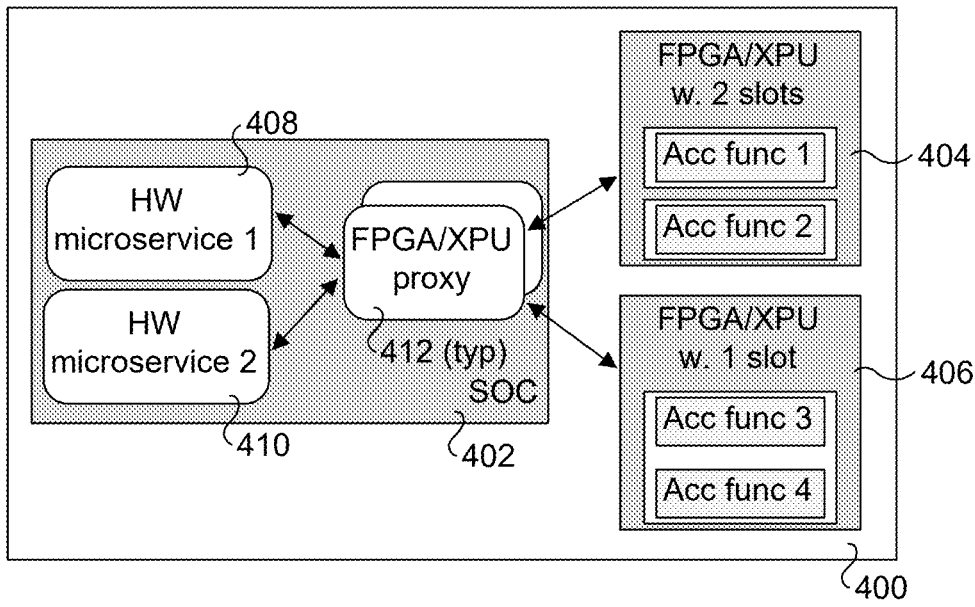
FIG. 4 is a diagram illustrating a platform implementing a pair of HW microservices and including accelerator functions implemented in a pair of FPGAs or XPUs.
Figure 5:
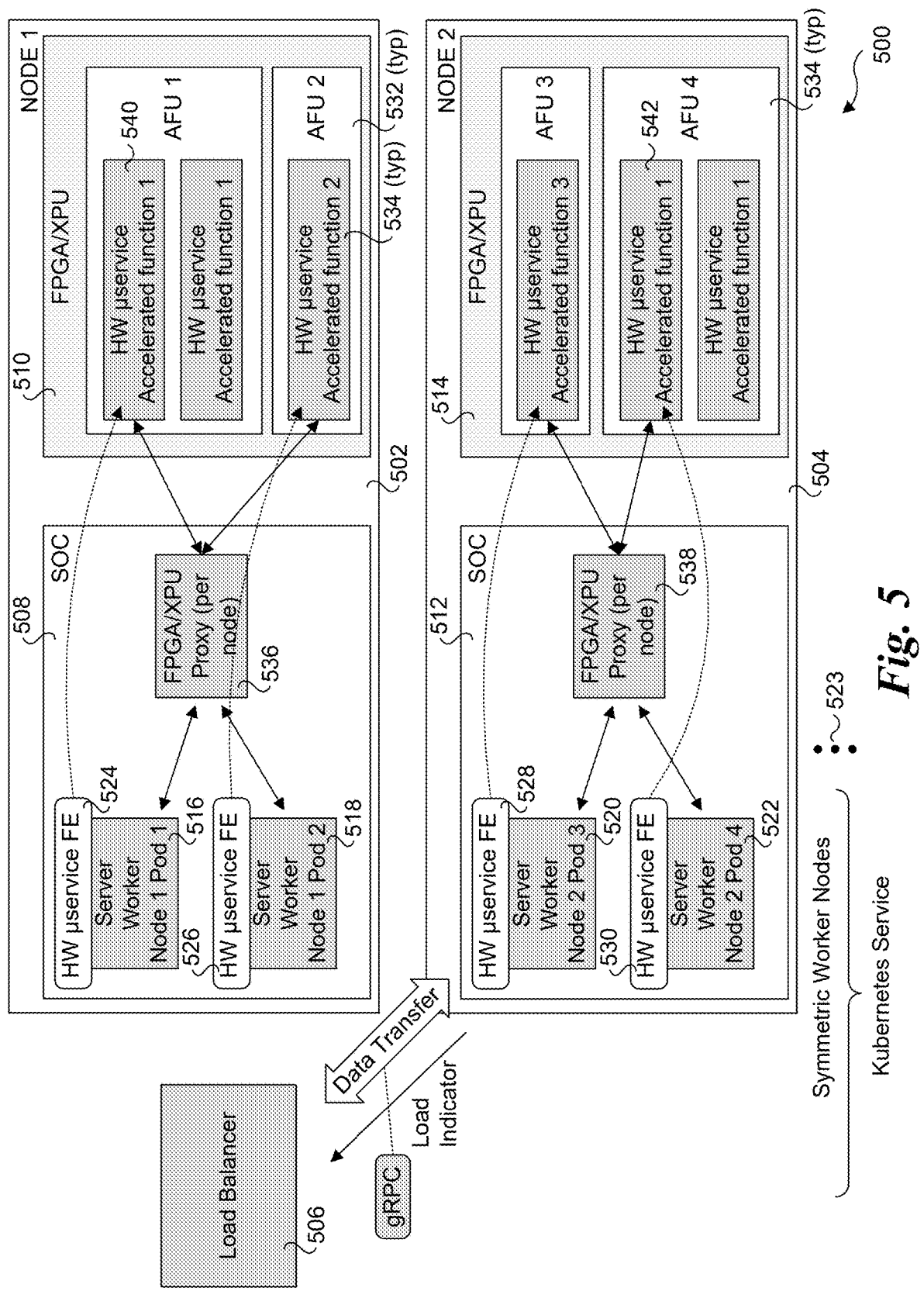
FIG. 5 is a diagram illustrating a deployment of HW microservices using Kubernetes pods.

FIGS. 4 and 5 shows some additional use cases. Platform 400 in FIG. 4 includes an SOC 402, an FPGA/XPU 404, and an FPGA/XPU 406 with one slot. SOC 402 is used to implement HW microservices 408 and 410 (also labeled HW microservice 1 and HW microservice 2) and FPGA/XPU proxies 412, which support communication between HW microservices 408 and 410 and FPGA/XPU 404 and FPGA/XPU 406. The 2 slots in FPGA/XPU 404 are used to implement respective accelerator functions 1 and 2. The single slot of FPGA/XPU 406 is used to implement accelerator functions 3 and 4.

FIG. 5 shows an environment 500 including a pair of nodes 502 and 504 (also labeled NODE 1 and NODE 2) and a load balancer 506. Node 502 comprises a platform including an SOC 508 communicatively coupled to an FPGA/XPU 510, both of which are mounted or otherwise operatively coupled to the platform's circuit board. Similarly, node 504 comprises a platform including an SOC 512 communicatively coupled to an FPGA/XPU 514. Generally, nodes 502 and 504 may be deployed in the same server or in separate servers, including "headless" servers. For example, in some embodiments a node is a platform comprising a PCIe card that is installed in a PCIe expansion slot in a server. Such servers may have multiple PCIe expansion slots, thus a single server may include a single node or multiple nodes.

Generally, load balancer 506 may be implemented as software executing on a host CPU in a server. In some embodiments, a single load balancer may be used for multiple nodes, including nodes on separate servers. In other embodiments, each server has its own load balancer. In the illustrated embodiment, load balancer 506 transfers data (both send and receive) using gRPC calls. gRPC is an open-source high performance RPC (remote procedure call) framework initially developed at Google. It uses HTTP/2 for transport, Protocol Buffers as the interface description language, and is commonly used for connecting services in microservices style architecture. It can efficiently connect services in and across data centers with pluggable support for load balancing, tracing, health checking and authentication. Other embodiments may employ communication protocols other than gRPC, as the use of gRPC is merely exemplary and non-limiting.

Nodes 502 and 504 employ multiple symmetric worker nodes on which Kubernetes services are deployed Kubernetes containers. Under Kubernetes nomenclature, a Kubernetes pod is a group of containers that are deployed together on the same host, (e.g., the same physical server, same IPU, same node, etc.). A pod is the basic execution unit of a Kubernetes application and represents processes running on the clusters. A pod encapsulates an application's container (or multiple containers), storage resources, a unique network IP, and options that govern how the container(s) should run. A pod represents a unit of deployment: a single instance of an application in Kubernetes, which might consist of either a single container or a small number of containers that are tightly coupled and that share resources.

As shown in FIG. 5, a pair of server worker node pods 516 and 518 are deployed on node 502. Similarly, a pair of server worker node pods 520 and 522 are deployed on node 504. Additional server worker node pods may be deployed on similar nodes, as represented by ellipses 523.

Each server worker node pod is used to run one or more instances of a HW microservice front-end (FE), as illustrated by HW microservice FEs 524, 526, 528, and 530. Each of the HW microservice FEs operates as a front-end microservice server that utilizes an accelerated HW microservice backend. The accelerated HW microservice backends are implemented using Accelerator Functional Units (AFUs) 532 in FPGA/XPUs 510 and 514. Each AFU 532 is used to implement a given type of HW accelerated function, where an AFU may support one or more instances of the accelerated function. The HW accelerated functions are depicted by HW microservice accelerated functions 534 in FIG. 5, which are also labeled HW microservice accelerated functions 1, 2, and 3. As further shown, An FPGA/XPU proxy 536 is deployed via execution of an associated proxy service on SOC 508, while an FPGA/XPU proxy 538 is deployed via execution of an associated proxy service on SOC 512. The HW microservice FEs 524 and 526 (running on server worker node pods 516 and 518) tell FPGA/XPU proxy 536 (or the latter predicts based on incoming metrics, as discussed below)) to provision and/or reprovision the accelerated functions from an available datacenter-wide or local repository to make the FPGA or other type of XPU take on a new personality or personalities to meet the microservices' SLO. Any combination of multiple HW microservices (front ends) to one or more FPGA/XPU accelerated functions/slots may be supported. FPGA/XPU proxy 536 enables HW microservice FEs 524 and 526 to multiplex FPGA/XPU 510 between different predetermined applications. Similarly, FPGA/XPU proxy 538 enables HW microservice FEs 528 and 530 to multiplex FPGA/XPU 510 between different predetermined applications.

As shown in FIG. 5, a first instance 540 of HW microservice accelerated function 1 in AFU 1 is allocated by FPGA/XPU proxy 536 to HW microservice FE 524, while HW microservice accelerated function 2 in AFU 2 is allocated to HW microservice FE 526. Also, FPGA/XPU proxy 538 allocates HW microservice accelerated function 3 in APU 3 to HW microservice FE 528 and allocates a first instance 542 of HW microservice accelerated function 1 in APU 4 to HW microservice FE 530. The term allocate here indicates the FPGA/XPU proxies 536 and 538 provide multiplexed access to the HW microservice accelerated functions, as these functions may be shared with other HW microservice FEs running on the same or other nodes.

In one embodiment, the HW microservice FEs and the accelerated functions provide telemetry and other feedback to FPGA/XPU proxies 536 and 538. For example, 1) acceleration function A's suitability for a given HW microservices; 2) bitstream A and B placements optimization when sharing of a single slot; or 3) available FPGA PE/resources.

In one embodiment, an FPGA/XPU proxy may implement ICN/CCN/NDN (Information Centric Network/Content Centric Network/Named Data Networking) or similar dynamic service discovery and translate it into the set of required resources and their availability on any node, and acknowledge the acceptance of service request in the case when it can be performed. The FPGA/XPU proxy may start preparing and provisioning resources for a new service (like loading required firmware/software, etc.) even before receiving the actual service request, which will save time if it is selected for the service.

With knowledge of specific acceleration functions, the FPGA/XPU proxy predicts, programs, and schedules the FPGA or XPU based on pre-existing characteristics of the functions and feedback from the microservice front ends. The FPGA/XPU proxy inspects requests (e.g., packet inspection) from a client or microservice "client" and determines an optimal processing entity (software, XPU, ASIC) for the HW microservices based on monitored performance telemetry and health to meet.

The FPGA/XPU can interact with the HW microservices to understand accelerated function requirements and manage incoming traffic requests meant for the FPGA or XPU. This interaction can be performed along with doing, for example, packet inspection to understand the packet type and forward it to the appropriate accelerated functions based on the latter's KPIs (Key Performance Indicators). The FPGA/XPU proxy also monitors, manages, and allocates/deallocates accelerated functions in the FPGA/XPU.

In some embodiments, the FPGA/XPU can also perform security attestation of HW microservices and establishes/manages security domains across software and HW microservices. It includes transport security, processing domains separation, network virtualization, enforcement of Trusted Execution Environment configurations (for instance, memory or bus encryption within HW microservices). If we look at a set of network-connected nodes each one having its own subset of HW and SW microservices, this set (referred to as a virtual pod) creates a network of proxies, each one responsible for security of its own node and all together create the end-to-end security domain. Such proxies securely communicate with each other to share information about their own node status, capacities, capabilities and security information and also enable securely passing HW microservices input and output information for service chain scenarios.

The FPGA/XPU proxy predicts HW microservices future behaviors based on microservice and accelerated functions' telemetry and feedback to meet the microservices' service level objective (SLO) including personality change of FPGA or XPU. It may also be used to select an accelerated function or a mix thereof to support better throughput of the incoming traffic, e.g., if the amount of compression requests coming is low but encryption requests are high, the hardware microservice server can tell the FPGA/XPU proxy or the FPGA/XPU proxy can predicts based on this information to reprogram one or more of the FPGA slots with the encryption kernel to support the throughput as well as SLA/SLO for that HW microservice.

In one embodiment, the FPGA/XPU proxy provides the capability to select partial acceleration vs full acceleration. For example, some algorithms can be split across SW and HW microservices with heavy processing being performed in HW and the remaining part performed in software. Such option is communicated to the service initiator, and the resulting split between HW and SW is negotiated on behalf of the HW microservices.

This applies to other XPUs as well such as virtual XPUs (vXPUs). A vXPU is a unit of XPU that is enabled to be shared among multiple microservices. In the case where the XPU is an FPGA the hardware microservices can perform partial reconfiguration to update the kernels in the slots or in the AFU without affecting the other running kernels or the network traffic.

The FPGA/XPU proxy may also provide feedback to the HW microservices so they can better choose a HW or SW options and perhaps even have the FPGA/XPU proxy choose a software solution, as well.

Figure 6:
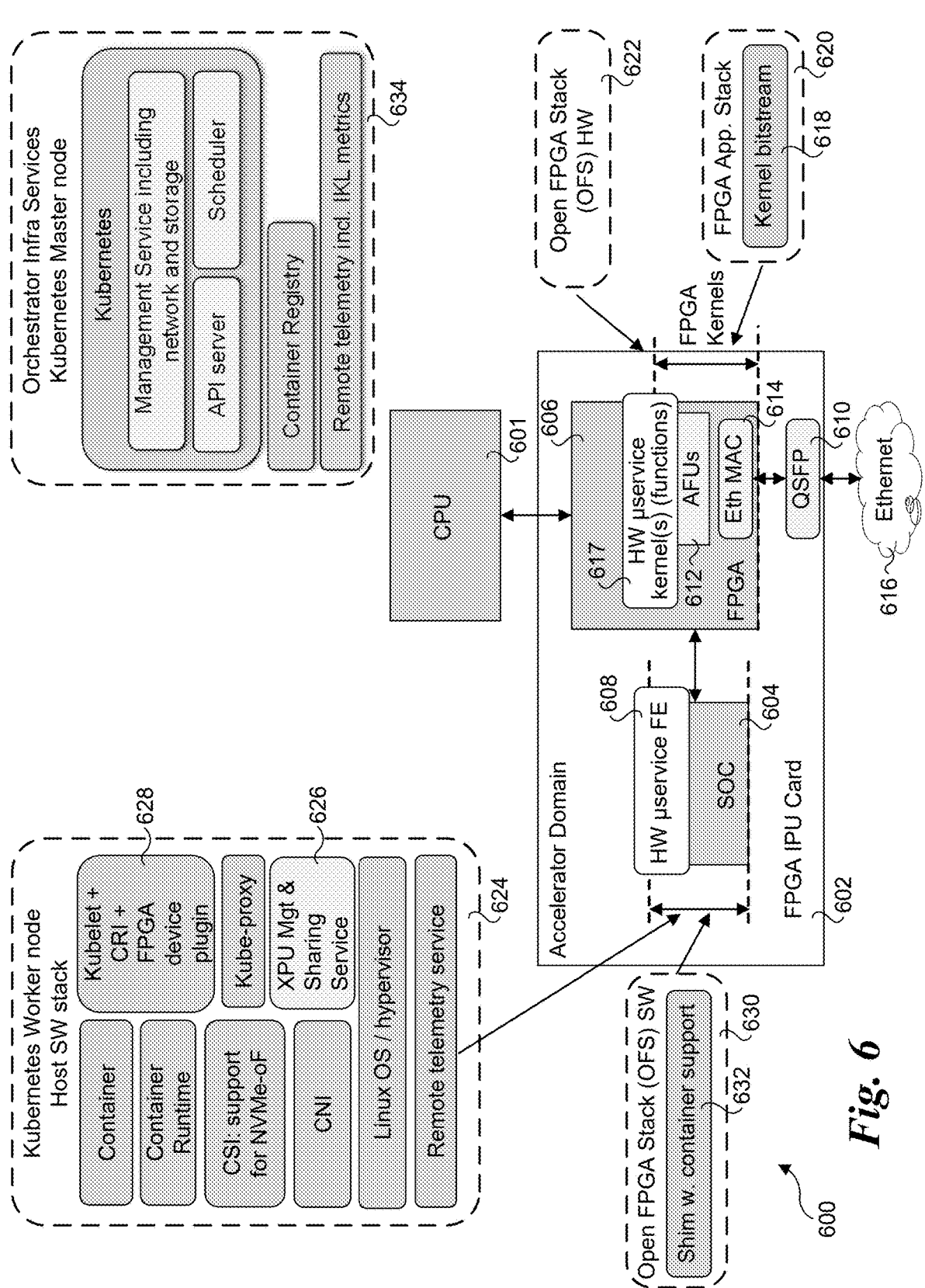
FIG. 6 is a diagram illustrating a first example of a HW microservice architecture using SOC and an FPGA.

FIG. 6 shows an example of a HW microservice architecture 600 using SOC+FPGA. A similar architecture may apply to SOC+XPU (where the XPU is not an FGPA). A CPU 601 is coupled to an FPGA IPU card 602 including an SOC 604, an FPGA 606, and one or more QSFP modules 610. In one embodiment the FPGA IPU card is a PCIe card installed in a PCIe expansion slot of a server including CPU 601, where CPU 601 and FPGA 606 communicate using PCIe (e.g., PCIe transaction layer packets (TLPs)). A HW microservice front-end (FE) 608 comprising software runs on SOC 604, while FPGA 606 includes one or more acceleration function units (AFUs) 612 that are used to implement HW microservice kernels. FPGA 606 further includes an Ethernet MAC block 614 that is coupled to the one or more QSFP modules 610, which in turn are coupled to an Ethernet network 616.

The HW microservice kernel(s) 617 are microservice functions programmed in AFUs 612 using an FPGA kernel bitstream(s), as depicted by a kernel bitstream 618 in FPGA application stack 620. FPGA 606 also implements the hardware components of an Intel® Open FPGA Stack (OFS) 622. OFS is a scalable, source-accessible hardware and software infrastructure delivered via git repositories that enables users to customize acceleration platform solutions.

SOC 604 is used to host execution of Kubernetes worker node software, as depicted by Kubernetes worker node host SW stack 624. These include conventional Kubernetes software components that are deployed in a Kubernetes pod, plus additional software components including an XPU management and sharing service 626 used to implement the FPGA/XPU proxy functionality described and illustrated herein.

The components in Kubelet+CRI+FPGA device plugin block 628 are Kubernetes components. The Kubelet is the primary "node agent" that runs on each node. It can register the node with the API server using one of: the hostname; a flag to override the hostname; or specific logic for a cloud provider. The Kubelet works in terms of a PodSpec. A PodSpec is a YAML or JSON object that describes a pod. CRI stands for Container Runtime Interface in Kubernetes. The most widely known container runtime is Docker. As part of the effort to make Kubernetes more extensible, the community has been working on a new plugin API for container runtimes in Kubernetes, called "CRI". FPGA device plugin is responsible for discovering and reporting FPGA devices to the Kubelet. During the allocation phase, it instructs the Kubelet about device nodes to be accessed by the container and sets the annotation that is later on passed to CRI to trigger programming by the CRI-O hook.

SOC 604 is also used to execute OFS software 630 including a shim with container support 632. In one embodiment, OFS software 630 represents the software components in the Intel® Open FPGA Stack. The use of OFS is merely exemplary and non-limiting, as other FPGA software may also be used.

HW microservice architecture 600 further depicts an orchestrator infrastructure services Kubernetes master node 634. This represents Kubernetes software implemented in by an orchestrator node that is used to manage infrastructure services across the deployment environment, such as in a data center.

Figure 7:
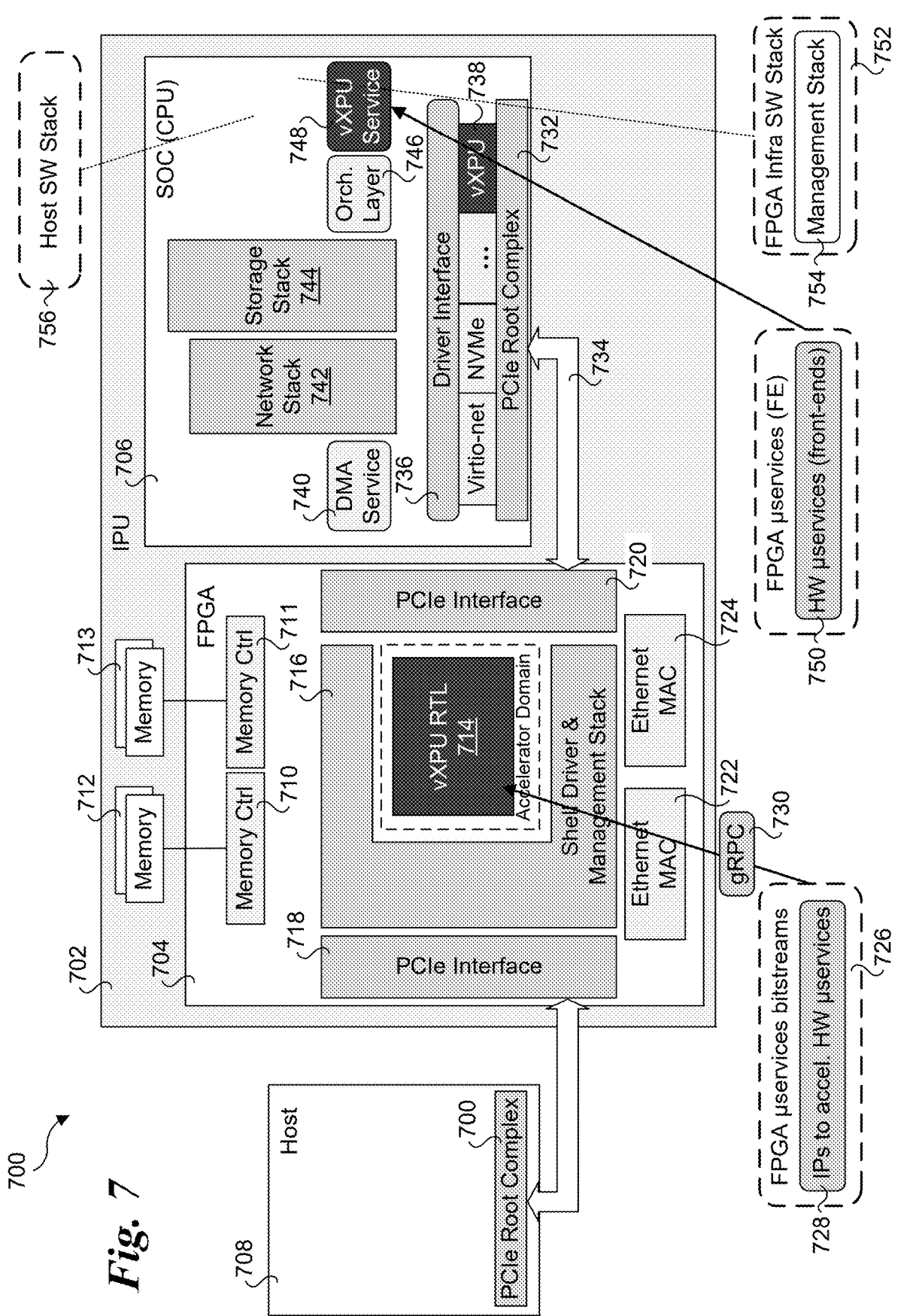
FIG. 7 is a diagram illustrating a second example of a HW microservice architecture using SOC and an FPGA.

FIG. 7 shows a HW microservice architecture 700 on a platform employing an SOC and FPGA. The top-level components of comprise a platform comprising an IPU 702 including an FPGA 704 and an SOC 706, and an abstracted view of a host 708. FPGA 704 includes one or more integrated memory controllers coupled to one or more memory devices that are on the IPU board and external to FPGA 704. For example, the illustrated embodiment shows a pair of memory controllers 710 and 711 coupled to memory devices 712 and 713. FPGA 704 also includes a vXPU RTL block 714, a shell driver and management stack 716, PCIe interfaces 718 and 720, and Ethernet MAC blocks 722 and 724. Shell driver and management stack 716 include IP blocks that interface with software drivers and management components on SOC 706. For example, the IP blocks may include a Virtio DMA (Direct Memory Access) block, and an NVMe (Non-volatile Memory Express (NVMe®)) block, and an Open vSwitch block, in one embodiment.

vXPU RTL block 714 is programmed with FPGA microservices bitstreams 726 including IPs to accelerator HW microservices 728. In the illustrated embodiment, gRPC calls 730 are used for streaming FPGA microservices bitstreams 726 to FPGA 704.

SOC 706 is illustrative of the SOC components described and illustrated herein. In some embodiments, and SOC is a CPU employing an SOC architecture. For example, SOC 706 may comprise an Intel® Xeon-DR CPU/SOC or an ARM®-based CPU/SOC. The SOC will include one or more cores for executing software components; for illustrative purposes, the cores are not shown in the SOCs herein as one having skill in the art would recognize such one or more cores would be present. In addition, an SOC would include various other components and interconnect circuitry, including caches, I/O (input/output) interconnects, power control blocks, etc. Part of the I/O circuitry includes a PCIe root complex 732 that would include a PCIe root port or other PCIe interface (not separately shown) connected to PCIe interface 720 over a PCIe link 734.

SOC 706 depicts selected software components that are executed on the one or more cores. These include a driver interface 736 that operates as an interface between various drivers and software implemented in layers above the driver interface layer. Exemplary drivers include a vXPU driver 738, a Virtio-net driver, and an NVMe driver. The drivers are used to provide and interface to corresponding hardware IP blocks on FPGA 704, such as vXPU RTL block 714 and IP blocks in shell driver and management stack 716.

Software components implemented in one or more layers above driver interface 736 include a DMA service 740, a network stack 742 a storage stack 744, an orchestration layer 746 and a vXPU service 748. In one non-limiting embodiment, network stack 742 employs an Open vSwitch (OVS) network stack. In one non-limiting embodiment, storage stack 744 employs an NVMe stack. vXPU service 748 is used to implement HW microservice front-ends 750.

Additional software components that are executed on the cores of SOC 706 include an FPGA infrastructure software stack 752 including a management stack 754, and a host software stack 756. In one embodiment, host software stack 756 comprises Kubernetes worker node host SW stack 624 shown in FIG. 6 and described above.

HW Microservices Deployment Models

Various deployment models may be used to deploy hardware microservices. In each of the following deployment models, the orchestrator takes the HW microservices components from a datacenter repository or from a marketplace repository or the like.

Under a first model, HW microservices are pre-provisioned ahead of time onto IPU and SOC+XPU platform/ cards in the datacenter and advertised to the orchestrator, e.g., Kubernetes, as a resource (see below) or a microservice (special type with some attributes such as performance (requests/sec.), HW attributes, SLA attributes, etc. In this case, when deploying the HW microservice, the orchestrator selects and allocates the SOC and XPU resources, provisions/deploys/configures the HW microservices components and configures networking, storage and software and hardware components including the HW microservices.

The orchestration selection is based on the kernel along with some on attributes or as a pre-defined sized HW microservices like with VMs, e.g., gzip_gold, gzip_silver, etc. In the case of infrastructure acceleration, the HW microservice is pre-deployed into the IPU/SOC+XPU and network or storage, for example, is configured by the orchestrator or a service running on the SOC or IPU as the application is being deployed and ready to use the HW microservices.

Under a second model, HW microservices are deployed and provisioned as part of the larger microservice application. In the case of workload acceleration, the HW microservices are pulled from a repository (including the software component and XPU bitstream/software) and are deployed by the orchestrator (e.g., Kubernetes) into the selected SOC and FPGA combination as part of the larger application deployment by the orchestrator. The orchestrator selection is based on mapping attributes for the HW microservices with XPU and SOC HW attributes along with required networking, storage, and SOC-XPU interconnect requirements.

As discussed above, HW microservices are divided up in their two components. Under a third model, the software front-end/server component will be is stored in the repository until it is ready to be deployed by the orchestrator. The XPU bitstream/software will be pre-programmed into the XPU in the IPU/SOC-XPU in the datacenter ahead of time and advertised to the orchestrator (e.g., Kubernetes) as an accelerated function (AF). When the orchestrator is deploying the HW microservice front-end, it selects a specific accelerated AF, the specific SOC (Xeon®-D, ARM®, ASIC, etc.) to run the front-end code and configure/connect the front-end to the backend AF.

In some embodiments, fingerprinting from past usage for microservices and accelerators are used to determine placement of HW microservices. This allows for predicting optimal placement and future state. In one embodiment, a database with previous fingerprinting traces available in the datacenter and serving as input to the orchestrator is used. Telemetry data that might be considered for fingerprinting include resource usage, error, thermal, connectivity metric between FPGA and SOC, load, BW, latency, etc. In some embodiments, HW microservices (on SOC+XPU) are dis-aggregated resources in the datacenter so they should be scheduled and provisioned as a unit.

Generally, HW microservices are described as a resource and not as a list of resources that compose the HW micro-service. For example, the HW microservice may be stored in a gzip file or the like, including metadata (e.g., a metadata file). The metadata describing such HW microservices for the user should include functionality, such as compression/ gzip algorithm, and KPIs, such as compression rate.

Generally, HW microservices may be running in the same domain or an independent domain from the host CPU. Because of the tight coupling between the host code and the XPU code/FPGA kernel, they should be considered as one unit (can be viewed, for example, as one virtual Kubernetes pod for a container-based implementation) that is deployed/ provisioned/run as a unit.

The scheduling a microservice application composed of both SW and HW microservices can be done either through invoking HW microservices under resources in, for example, the deployment manifest or by defining the HW microservices. The interfaces should be aligned with popular Cloud Native Standards, such as but not limited to Kubernetes.

This new "resource," which defines a combination of resources enables the orchestrator to perform scheduling at the cluster level rather than at the resource level ensuring that the users do not have to deal with the individual HW resources that are composing a HW microservices and can just focus on the functionality, SLA/performance or other requirements of the HW microservice they need.

Exemplary IPU Card

Figure 8:
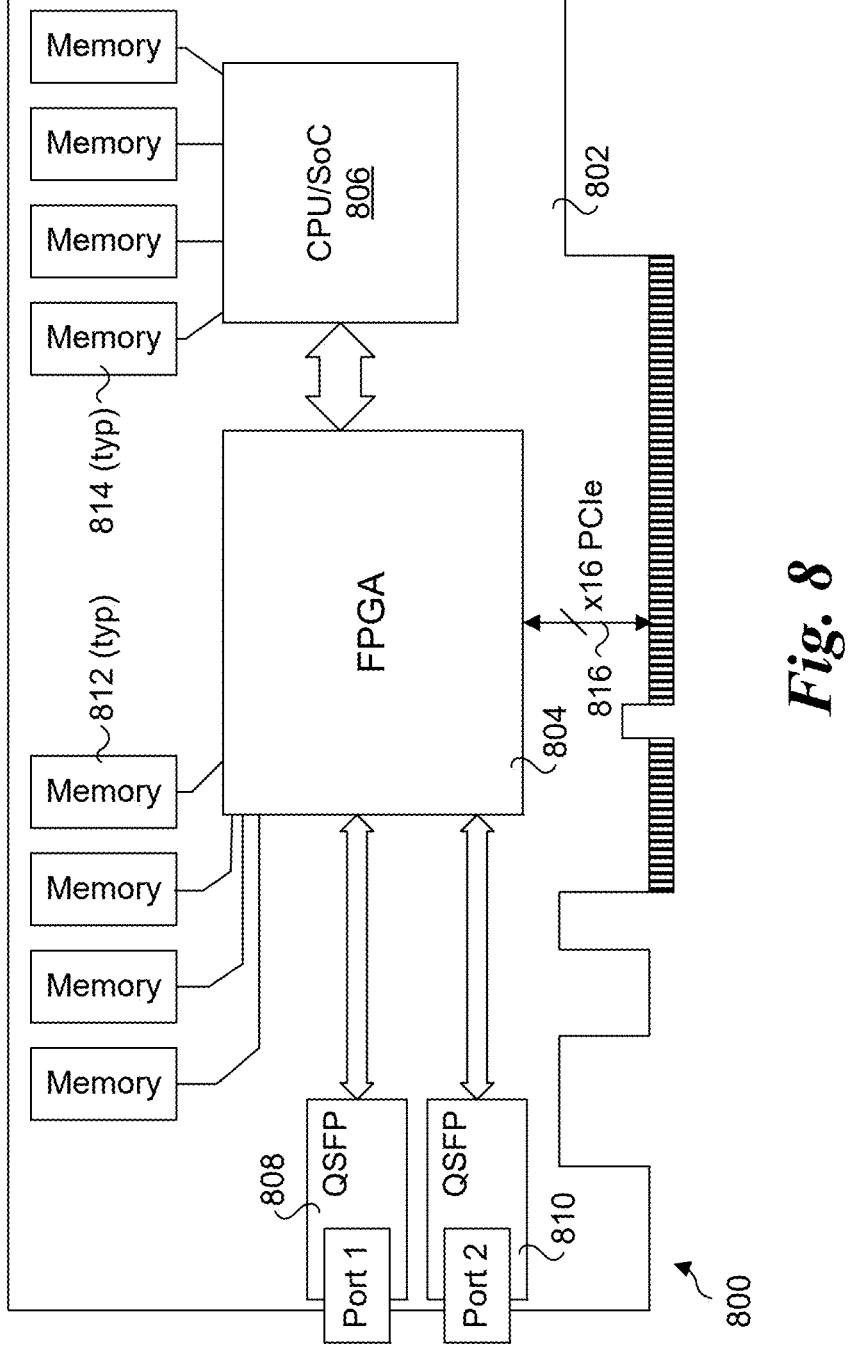
FIG. 8 is a diagram of an exemplary IPU card.

FIG. 8 shows one embodiment of IPU 800 comprising a PCIe card including a circuit board 802 having a PCIe edge connector to which various integrated circuit (IC) chips are mounted. The IC chips include an FPGA 804, a CPU/SOC 806, a pair of QSFP modules 808 and 810, and memory chips 812 and 814. The various functions and operations performed by embodiments of IPUs described and illustrated herein may be implemented by programmed logic in FPGA 804 and/or execution of software on CPU/SOC 806. As discussed above, FPGA 804 may include logic that is pre-programmed (e.g., by a manufacturing) and/or logic that is programmed in the field (e.g., using FPGA bitstreams and the like). For example, logic in FPGA 804 may be programmed by a host CPU for a platform in which IPU 800 is installed. IPU 800 may also include other interfaces (not shown) that may be used to program logic in FPGA 804.

CPU/SOC 806 employs a System on a Chip including multiple processor cores. Various CPU/processor architectures may be used, including but not limited to x86, ARM®, and RISC (e.g., RISC-V) architectures. In one non-limiting example, CPU/SOC 806 comprises an Intel® Xeon®-D processor. Software executed on the processor cores may be loaded into memory 814, either from a storage device (not shown), for a host, or received over a network coupled to NIC 808 or NIC 810.

The HW microservice solutions described and illustrated herein provide numerous advantages over current approaches. For example, the HW microservices solutions encapsulate a novel approach of optimizing and processing "sharing" of an XPU or XPUs between multiple microservices through "smart" multiplexing of the XPU between different predetermined applications. This novel approach is the first built around hardware microservices sharing of the XPU through multiplexing on the same acceleration function, on multiple acceleration functions running concurrently on the same XPU or multiple XPUs or on-demand reprovisioning of accelerated functions based on the micro-services' SLO.

With knowledge of specific acceleration functions, the XPU proxy controller predicts, programs, and schedules the XPU based on pre-existing characteristics of the functions and feedback from the microservices and the accelerated functions. The XPU proxy controller predicts HW microservices future behaviors based on microservice and accelerated functions telemetry and feedback data to meet the microservices SLO including personality change of XPU. The XPU proxy controller inspects requests (e.g., packet inspection) from a client or microservice "client" and selects an optimal processing entity (software, XPU, ASIC) for the HW microservices based on monitored performance telemetry and health to meet microservices' SLO.

Embodiments of the HW microservices reconfigure kernels personality based on power, bandwidth, and better throughput to meet microservices SLOs. In addition, the HW microservices automates kernel selections based on microservice and accelerated function feedback to meet microservices SLOs.

Automated as well as microservice-driven and accelerated function-driven solutions are provided. For example, the HW microservice server front-end provisions and reprovisions the XPU bits to make the XPU take on a new personality to support better throughput of the incoming traffic, e.g., if the amount of compression requests coming is low but encryption requests are high the HW microservice server can reprogram one or more of the FPGA slots with the encryption kernel to support the thought put as well as SLA/SLO for that HW microservice. This applies to other XPUS as well such as vXPU.

In accordance with further aspects of the solutions, the HW microservices treat the FPGA like a general processor as the FPGA can be reprogrammed/reconfigured and managed to fit different personalities. The HW microservices can be chained to support efficient pipelining of tasks and data movement. The ingress network traffic can go directly to the FPGA/XPU accelerated function (via our FPGA/XPU Proxy or directly) for processing and the resulting egress traffic is returned directly to the datacenter network without involving the CPU. The solutions enable HW microservice service chaining and pipelining over Ethernet or other interconnects, such as CXL/Glueless configurations of XPUs.

A pool of FPGAs/XPUs can be dynamically assigned on a per slot/per AFU/and shared to composed HW microservices. The HW microservices optimize IPU acceleration through its flexibility and architecture, e.g., in the pipeline for storage and network support.

In the case of IPUs, HW microservices can be customized optimize resources on-demand/real-time and allowed for more and/or wider PCIe/CXL lanes and other interconnects between processors and devices including custom protocols, customizations of network traffic, etc., leading to more bandwidth and lower latency between the processors and the devices.

In accordance with another aspect, when FPGAs are implemented as XPUs, they can be used as root of trust to control boot sequence and store keys and certifications, which is often a problem in software-only environments.

Generally, an SOC as it is deployed on SOC+XPU platform or in IPU may comprise a lower-power SOC (relative to a host compute CPU) and usually is deployed in its own domain in order to not use or impede or cause a security issue workload running in the host compute CPU.

In one aspect, the HW microservice may access memory and/or storage resources attached to the SOC, e.g., local disk, memory, etc. as well as remote storage through NVMe over Fabric (NVMe-oF), etc.

Generally, a HW microservice is one resource and as such is not an aggregation of resources and software. It is equivalent to a device, a CPU, an XPU, etc. A customer using, for example, the managed Kubernetes service does not know what the HW microservice is running on, just its SLA/functionality/algorithm and KPIs.

When deployed under the first model presented above, the server front-end of the HW microservice can provision and reprovision the XPU bits to make the XPU take on a new personality to support better throughput of the incoming traffic, e.g., if the amount of compression requests coming is low but encryption requests are high the HW microservice server can reprogram one or more of the FPGA slots with the encryption kernel to support the thought put as well as SLA/SLO for that HW microservice. This applies to other XPUs as well such as vXPU.

HW microservices can be or can monitor and manage the load and carry out remediation operations on the XPU based on telemetry received and feedback loops including AI (Artificial Intelligence) algorithms to support meeting SLO/SLAs. For example, if an XPU temperature gets too high, the XPU could be throttled and/or feedback could be sent to the main service/load-balancer to indicate that this HW microservice has reached its limit and to stop sending as many requests. Once the temperature is within the normal range, the HW microservice could be advertised as healthy to the rest of the environment and stop throttling the XPU, for example.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (e.g., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, FPGAs, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A platform comprising:
a circuit board to which multiple components are operatively coupled, including,
a System On Chip (SOC), having a plurality of cores;
an Other Processing Unit (XPU), communicatively coupled to the SOC via interconnect circuitry in the circuit board;
an input/output (I/O) interface coupled to at least one of the SOC and XPU; and
memory, in which host software to be executed on one or more of the plurality of cores in the SOC is stored, including software code to implement one or more hardware (HW) microservice front-ends,
wherein the XPU is configured to implement one or more accelerator functions used to accelerate HW microservice backend operations that are offloaded from the one or more HW microservice front-ends, and
wherein the platform is configured to be coupled, via the I/O interface, to a compute host including a central processing unit (CPU) used to host software-based workloads.

2. The platform of claim 1, wherein the host software includes an XPU proxy that is configured to enable HW microservices front-ends to share the one or more accelerator functions.

3. The platform of claim 2, wherein the XPU proxy is configured to:
receive telemetry data generated from at least one of the HW microservice front-ends and the one or more accelerator functions; and
schedule access to the accelerator functions by the HW microservice front-ends based, at least in part, on the telemetry data.

4. The platform of claim 2, wherein the host software includes software code for implementing a software microservice, and wherein the XPU proxy is configured to determine that a microservice should be implemented as a software microservice or a HW microservice.

5. The platform of claim 1, wherein the XPU comprises a Field Programmable Gate Array (FPGA), and the one or more accelerated functions comprise FPGA kernels.

6. The platform of claim 5, wherein the host software is configured to:
provision accelerator functions in the FPGA by sending FPGA kernel bitstreams to the FPGA; and
reprovision FPGA bits for at least one accelerator function by sending a new FPGA kernel bitstream to the FPGA.

7. The platform of claim 1, wherein the platform comprises an infrastructure processing unit (IPU).

8. The platform of claim 7, wherein the XPU comprises a Field Programmable Gate Array (FPGA), wherein the IPU comprises a Peripheral Component Interconnect Express (PCIe) card, and the FPGA is configured to implement one or more PCIe interfaces, one of which is the I/O interface.

9. The platform of claim 1, wherein the platform is configured to be installed in a server comprising the compute host.

10. A method implemented on a platform including a System on Chip (SOC) operatively coupled to a circuit board and communicatively coupled to an other processing unit (XPU) operatively coupled to the circuit board, comprising:

configuring the XPU to implement one or more accelerator functions;

splitting execution of a microservice between a hardware front-end and a hardware backend, wherein the hardware front-end is executed via execution of software on the SOC, and the hardware backend is used to execute an offloaded portion of the microservice on an accelerator function in the XPU, wherein the platform is coupled to a compute host having a central processing unit (CPU) hosting software-based workloads.

11. The method of claim 10, wherein the XPU comprises a Field Programmable Gate Array (FPGA), further comprising programming an accelerator kernel in the FPGA to implement an accelerator function.

12. The method of claim 10, further comprising:

executing a plurality of hardware front-ends on the SOC; and sharing the one or more accelerator functions among the plurality of hardware front-ends.

13. The method of claim 12, further comprising:

obtaining telemetry data generated from at least one of the hardware front-ends and the one or more accelerator functions; and scheduling access to the accelerator functions by the hardware front-ends based, at least in part, on the telemetry data.

14. The method of claim 10, wherein the platform comprises an infrastructure processing unit (IPU) and the XPU comprises a Field Programmable Gate Array (FPGA).

15. The method of claim 10, wherein the method is implemented on a platform in a data center, and wherein the hardware front-end is run in a server worker pod in the data center.

16. A non-transitory machine-readable medium having software instructions stored thereon configured to be executed on one or more cores on a System on Chip (SOC) in a platform including the SOC and an other processing unit (XPU) communicatively coupled to the SOC, the XPU configured to implement one or more accelerator functions, wherein execution of the instructions on the SOC enables the platform to:

implement a hardware (HW) microservice front-end that performs a first portion of a microservice;

determine a second portion of the microservice to offload to a first accelerator function; and offload the second portion of the microservice to the XPU to execute the first accelerator function.

17. The non-transitory machine-readable medium of claim 16, wherein execution of the software instructions enables the platform to implement a plurality of HW microservice front-ends, wherein the software instructions include a software instruction for implementing an XPU proxy service, wherein the XPU proxy service facilitates sharing of the one or more accelerator functions among the plurality of HW microservice front-ends.

18. The non-transitory machine-readable medium of claim 17, wherein execution of the software instructions further enabled the platform to:

receive telemetry data generated from at least one of the HW microservice front-ends and the one or more accelerator functions; and schedule access to an accelerator function by a HW microservice front-end based, at least in part, on the telemetry data.

19. The non-transitory machine-readable medium of claim 17, wherein execution of the software instructions enables the XPU proxy service to:

schedule access to the one or more accelerator functions based on pre-existing characteristics of the one or more accelerator functions and feedback from one or more of the plurality of HW microservice front-ends.

20. The non-transitory machine-readable medium of claim 16, wherein the XPU comprises a Field Programmable Gate Array (FPGA), and wherein execution of the software instructions further enables the platform to:

provision accelerator functions in the FPGA by sending FPGA kernel bitstreams to the FPGA; and reprovision FPGA bits for at least one accelerator function by sending a new FPGA kernel bitstream to the FPGA.

* * * * *